United States Patent
Iglesias Sedano et al.

(10) Patent No.: US 10,689,896 B2
(45) Date of Patent: Jun. 23, 2020

(54) WATERTIGHT ASSEMBLY FOR A WINDOW REGULATOR OF A VEHICLE

(71) Applicant: GRUPO ANTOLIN INGENIERÍA, S.A.U, Burgos (ES)

(72) Inventors: Ricardo Iglesias Sedano, Burgos (ES); Darío Soto Romero, Burgos (ES); César Marcos Conzález, Burgos (ES)

(73) Assignee: GRUPO ANTOLIN INGENIERÍA, S.A.U., Burgos (ES)

( * ) Notice: Subject to any disclaimer, the term of this patent is extended or adjusted under 35 U.S.C. 154(b) by 231 days.

(21) Appl. No.: 15/969,505

(22) Filed: May 2, 2018

(65) Prior Publication Data
US 2018/0320431 A1 Nov. 8, 2018

(30) Foreign Application Priority Data
May 5, 2017 (EP) ..................................... 17382253

(51) Int. Cl.
*E05F 15/697* (2015.01)
*H02K 5/22* (2006.01)
(Continued)

(52) U.S. Cl.
CPC ........... *E05F 15/697* (2015.01); *B60J 5/0418* (2013.01); *B60R 16/0215* (2013.01);
(Continued)

(58) Field of Classification Search
CPC ........................... E05F 15/697; B60R 16/0215
(Continued)

(56) References Cited

U.S. PATENT DOCUMENTS 8,669,726 B2 * 3/2014 Daiminger ......... G05B 19/4061
318/280

FOREIGN PATENT DOCUMENTS

DE 102005020790 A1 11/2006
DE 102014215222 A1 2/2016
(Continued)

OTHER PUBLICATIONS

Extended European Search Report dated Nov. 6, 2017 re: Application No. 17382253.7-1609, pp. 1-8, citing: DE 10 2014 215222 A1, DE 10 2005 020790 A1 and WO 2011/003745 A.

*Primary Examiner* — David Luo
(74) *Attorney, Agent, or Firm* — Cantor Colburn LLP

(57) ABSTRACT

The assembly includes a drive unit and an ECU connectable to the drive unit in an assembly direction Y, transverse to a rotary shaft of the motor. The ECU includes an L shaped support having a first part parallel to the assembly direction Y and a second part transverse to the first part Y and coupled in a sealing manner to an L shaped opening of the drive unit housing. The assembly includes a seal with a second sealing part which, when the ECU is coupled to the housing, is compressed in the assembly direction Y between the second part of the support and a second perimeter edge of a second opening of the housing and a first sealing part which, when the ECU is coupled to the housing, is housed in a gap defined between the first part and a first perimeter edge of a first opening of the housing, the gap and the first sealing part in a plane parallel to the assembly direction Y. The first sealing has two longitudinal branches and a transverse branch such that the longitudinal branches are compressed in a direction transverse to the assembly direction Y whilst the transverse branch is compressed in the assembly direction Y.

15 Claims, 10 Drawing Sheets

(51) Int. Cl.
*H02K 7/116* (2006.01)
*B60J 5/04* (2006.01)
*B60R 16/02* (2006.01)

(52) U.S. Cl.
CPC ........... *H02K 5/225* (2013.01); *H02K 7/1166* (2013.01); *B60Y 2410/115* (2013.01); *E05Y 2201/10* (2013.01); *E05Y 2201/434* (2013.01); *E05Y 2800/12* (2013.01); *E05Y 2900/55* (2013.01)

(58) Field of Classification Search
USPC ....................................................... 318/3, 34
See application file for complete search history.

(56) References Cited

FOREIGN PATENT DOCUMENTS

| | | |
|---|---|---|
| FR | 3024609 A1 | 2/2016 |
| FR | 3024610 A1 | 2/2016 |
| WO | 2004095675 A1 | 11/2004 |
| WO | 2006117265 A1 | 11/2006 |
| WO | 2011003745 A1 | 1/2011 |
| WO | 2011058972 A1 | 5/2011 |

* cited by examiner

WATERTIGHT ASSEMBLY FOR A WINDOW REGULATOR OF A VEHICLE

CROSS REFERENCE TO RELATED APPLICATIONS

This application is related to, and claims the benefit of, Spanish Patent Application No. EP 17382253.7, filed on May 5, 2017, the contents of which are herein incorporated by reference in their entirety.

TECHNICAL FIELD

The disclosure relates to driving units for window regulators for vehicles and especially to watertight assemblies for connecting the electronic control unit to the electric motor of the drive unit.

BACKGROUND

A window regulator for a vehicle comprises a drive unit with an electric motor and a gear system for transmitting force to the window regulator. An electronic control unit (ECU) comprising a support and a PCB is assembled to a housing of the drive unit for motor control. The ECU comprises also a motor connector for the electric connection to the shaft of the motor and a vehicle connector (plug with connection pins) for the connection to the vehicle wiring system. As the window regulator is mounted inside the vehicle door which is a wet area, the assembly between the drive unit and the ECU must be watertight, which implies a watertight coupling between the support of the ECU and the housing of the drive unit but also a watertight mounting of the connection pins to the support because humidity can reach the PCB of the ECU through the connection pins. A solution to guarantee the sealing of the connection pins can be to over-mold the connection pins with an elastomeric material what means that the pins have to be mounted first on the support of the ECU, then (after over-molding the elastomer) connect, by welding, the PCB to the connection pins and finally assembly the support to the housing of the drive unit. For welding the PCB to the connection pins is necessary to have a free access to the position of the connecting pins on the support but a problem arises because the free space inside the door is reduced. The ECU is coupled to the housing in an assembly direction orthogonal to the axis of the motor because the motor connector must be orthogonal to the axis of the motor but as the space is reduced the vehicle connector usually has to be placed in a direction parallel to the shaft of the motor and orthogonal to the assembly direction which means that the vehicle connector and the motor connector are mounted on the support orthogonally to each other. For that reason and to guarantee the free access needed for welding the PCB to the pins an open configuration of the support is used, for example an L shaped support couplable to an L shaped opening of the housing in the drive unit. For assuring the watertight connection between the L shaped support and the L shaped opening of the housing, seals with multiple lips are mounted internally around the perimeter of the L shaped opening. A problem arises because the lips of the seal get placed in two different orientations in relation to the assembly direction, so the lips of the seal (during and after the coupling of the ECU) can be bended or twisted leaving gaps for to the humidity to enter, resulting in a bad sealing. FR-3024609-A1, FR-3024610-A1, WO-2004/095675, WO-2006/117265, WO-2011/058972 describe seals for L shaped openings but all use seals with multiple lips which cannot assure a proper sealing, especially in parts of the seal which are placed radially to the assembly direction.

SUMMARY

The disclosure relates to a watertight assembly for a window regulator of a vehicle comprising a drive unit and an electronic control unit, herein after called ECU. The drive unit comprises a motor with a rotary shaft and a housing and the ECU is connectable to the drive unit in an assembly direction Y, transversal to the rotary shaft.

The housing comprises an L shaped opening for introducing and assembling the ECU into the housing, the L shaped opening comprising a first opening (comprised) in a plane parallel to the assembly direction Y and a second opening (comprised) in a plane transversal to the plane of the first opening in an angle ranging between 80 and 135 degrees (preferably 90 degrees).

The ECU Comprises an L shaped support couplable in a sealing manner to the L shaped opening of the housing of the drive unit, the support comprising a first part and a second part in an angle ranging between 80 and 135 degrees to the first part (and preferably in an angle of 90 degrees) such that the first part is couplable to the first opening and the second part is couplable to the second opening;

a PCB for motor control;

a motor connector for the connection to the motor, the motor connector being parallel to the assembly direction Y (when the ECU is coupled to the housing of the drive unit, the electrical terminal preferably remains extending orthogonal to the rotary shaft);

a vehicle connector with pins for connection to the vehicle wiring system, the pins being fixed transversally to the first part of the support and accessible for the connection to the PCB (when the ECU is coupled to the housing of the drive unit, the plug pins preferably remain extending parallel to the rotary shaft).

According to the disclosure the assembly comprises a seal with a second sealing part which, when the ECU is coupled to the housing, is comprised and compressed in a plane transversal to the assembly direction Y between the second part of the support and a second perimeter edge of the second opening of the housing and a first sealing part which, when the ECU is coupled to the housing, is housed in a gap defined between the first part of the support and a first perimeter edge of the first opening of the housing. The gap is U shaped and comprises two main branches and an intermediate branch between the main branches, the distance between the main branches decreasing progressively in the assembly direction Y. The first sealing part is U shaped and comprises two longitudinal branches and a transversal branch between the longitudinal branches, such that the gap and the first sealing part are comprised in a plane parallel to the assembly direction Y and the longitudinal branches are compressed in a direction transversal to the assembly direction Y whilst the transversal branch is compressed in the assembly direction Y. Preferably the longitudinal branches and the transversal branch are joined by curved parts.

In some embodiments of the disclosure the first part of the support and the first perimeter edge of the first opening are U shaped such that the U shaped first part of the support is insertable in the assembly direction Y in the U shaped first perimeter edge of the first opening when the ECU is coupled to the housing, defining the U shaped gap for housing the first sealing part.

In some embodiments the second part of the support comprises a U shaped surface and the second perimeter edge of the housing comprises a second perimeter rib in a plane transversal to the assembly direction such that the second sealing part is compressed between the U shaped surface and the second perimeter rib when the ECU is coupled to the housing, improving the sealing. In alternative embodiments the U shaped surface of the second part of the support comprises a longitudinal rib in a plane transversal to the assembly direction, such that the second sealing part is compressed between the second perimeter edge of the housing and the longitudinal rib, when the ECU is coupled to the housing.

Preferably the cross section of the main and intermediate branches of the gap is uniform and smaller than the cross section of the first sealing part.

In some embodiments the gap is defined between a perimeter guiding groove in the first part of the support and a first perimeter rib in the first perimeter edge of the housing such that the first perimeter rib of the housing slides inside the perimeter guiding groove of the support when the ECU is coupled to the drive unit. In alternative embodiments the gap is defined between a guiding groove in the first perimeter edge of the housing and a perimeter flange in the first part of the support such that the perimeter flange in the first part of the support slides inside the guiding groove of the housing when the ECU is coupled to the drive unit.

The seal can be assembled on the support of the ECU or on the housing of the drive unit. The seal can be overmolded on the support or on the housing.

In some embodiments the seal is rectangular cross shaped. The seal can be squared cross shaped or any other suitable shape for assuring a good sealing when compressed. The seal has no lips.

In some embodiments the first sealing part and the second sealing part are linked by joining parts to assure a good sealing even in the transition area between the first and second part. Preferably the first and second sealing parts are a single and continuous part.

The two longitudinal branches and the transversal branch of the first sealing part can be joined by curved parts.

In some embodiments the ECU comprises a sealing element between the pins and the vehicle connector. This sealing element can be a part of the seal.

The assembly further comprises attachment means in the support to engage with stopping means in the housing for securing the coupling.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. In the figures.

DETAILED DESCRIPTION OF THE DRAWINGS

Figure 1:
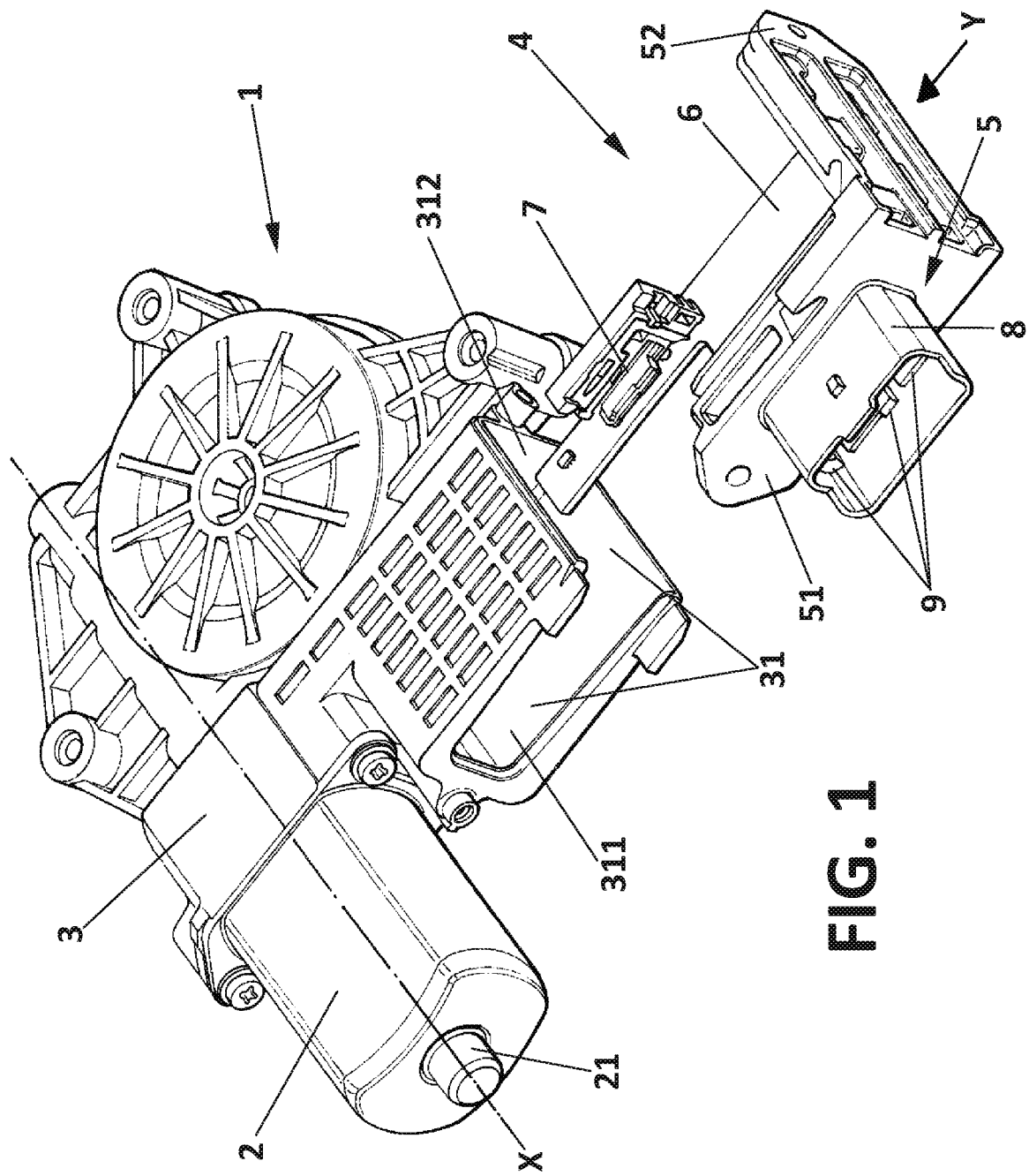
FIG. 1 is a perspective showing an initial position in the coupling of the ECU to the housing.
Figure 2:
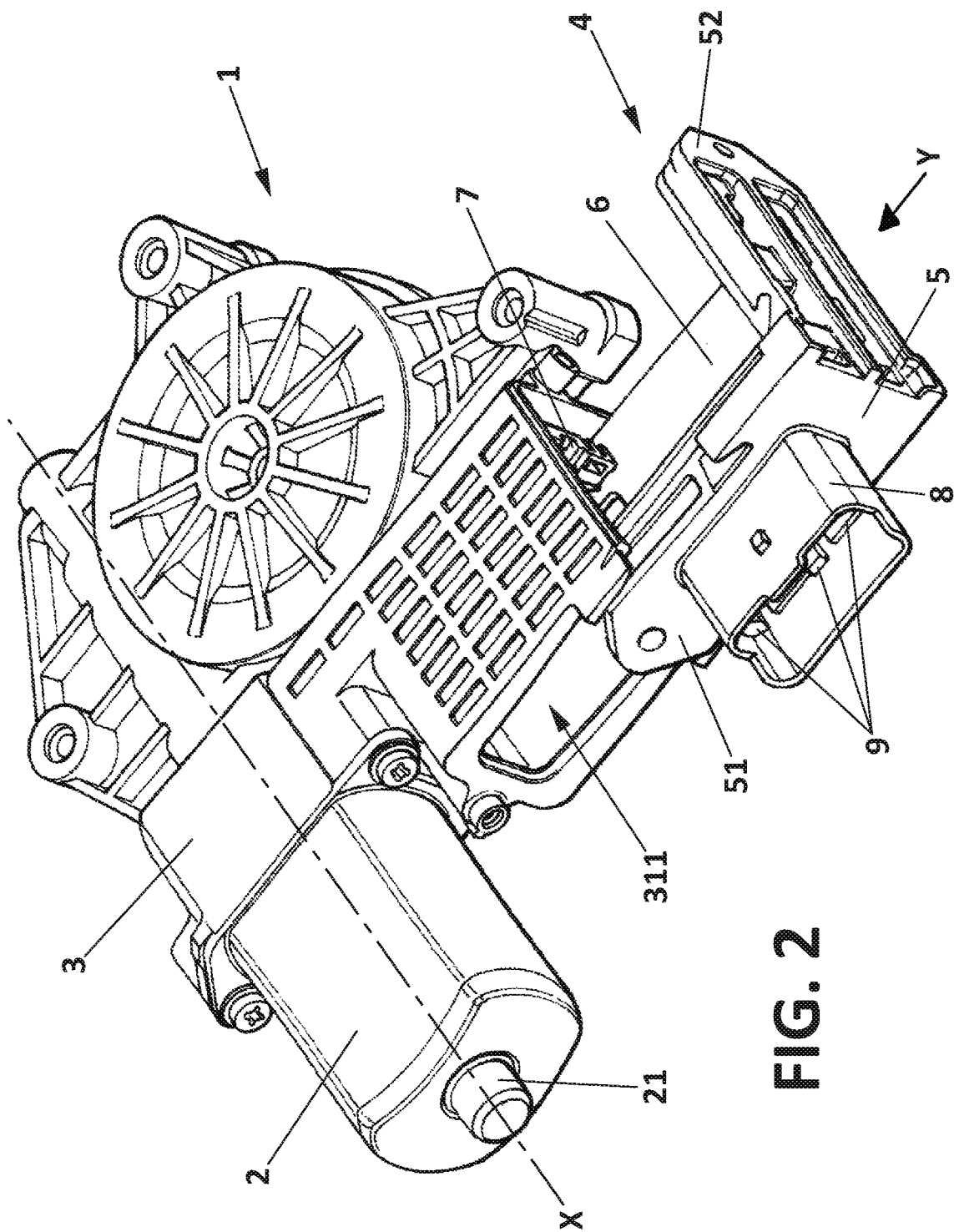
FIG. 2 is a perspective showing an intermediate position in the coupling of the ECU to the housing.
Figure 3:
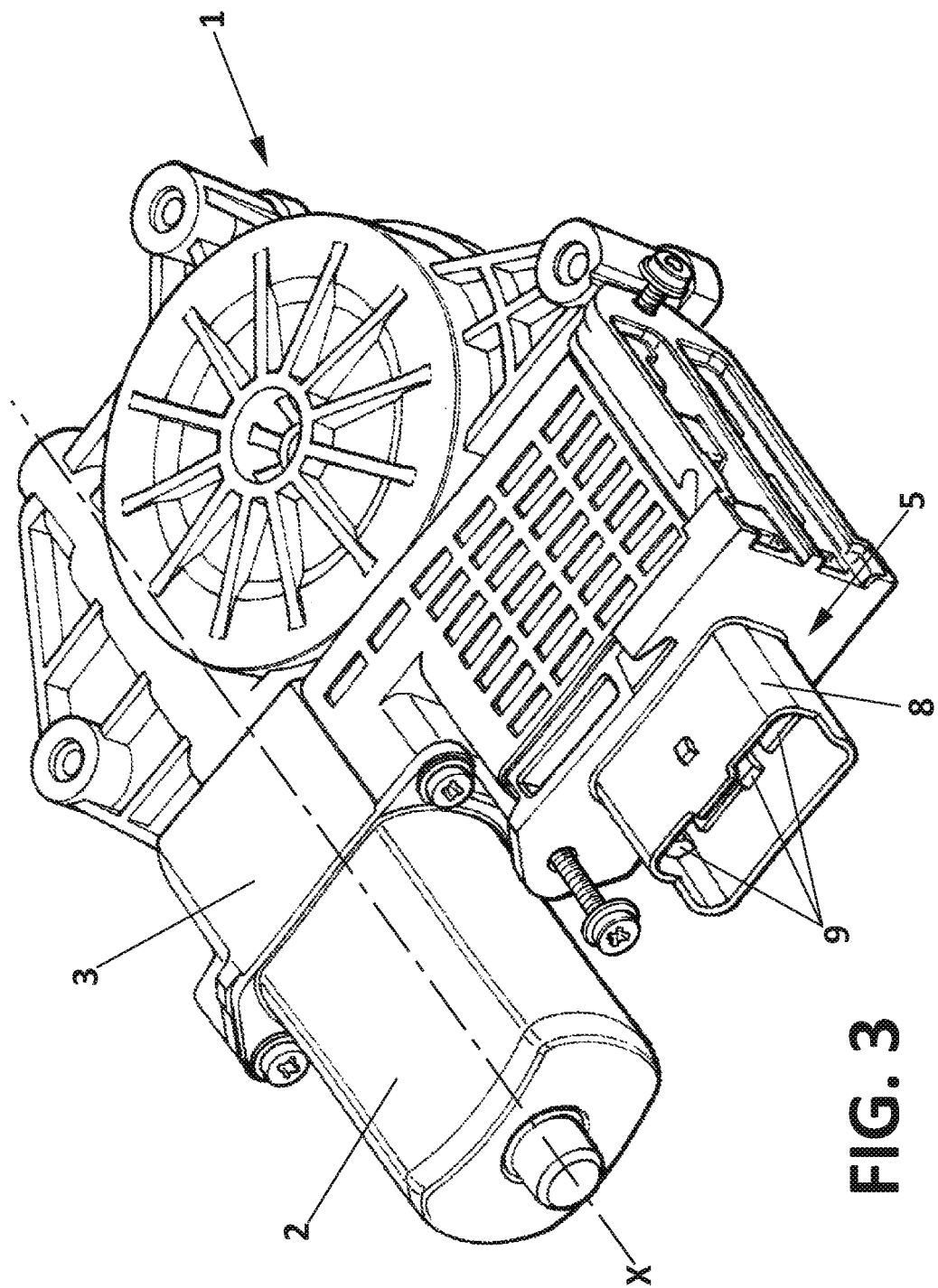
FIG. 3 is a perspective showing a final position in the coupling of the ECU to the housing.

FIG. 1 shows a drive unit 1 for a window regulator of a vehicle comprising an electric motor 2 with a rotary shaft 21 and a housing 3 for accommodating a gear system for transmitting force to a window mechanism. An ECU (electronic control unit) 4 is couplable to the housing 3 of the drive unit 1 in an assembly direction Y, transversal to the direction X of the rotary shaft 21, as shown in FIGS. 1, 2 and 3. The ECU 4 comprises a support 5, a PCB 6 for motor control, a motor connector 7 for the connection to the electric motor 2, and a vehicle connector 8 with pins 9 for connection to a vehicle wiring system, not shown.

FIG. 2 shows an intermediate position in the coupling operation of the ECU 4 to the housing 3 of the drive unit 1. FIG. 3 shows the final position when the ECU 4 is coupled in a sealing manner to the housing 3 of the drive unit 1 and secured by screws.

Figure 4:
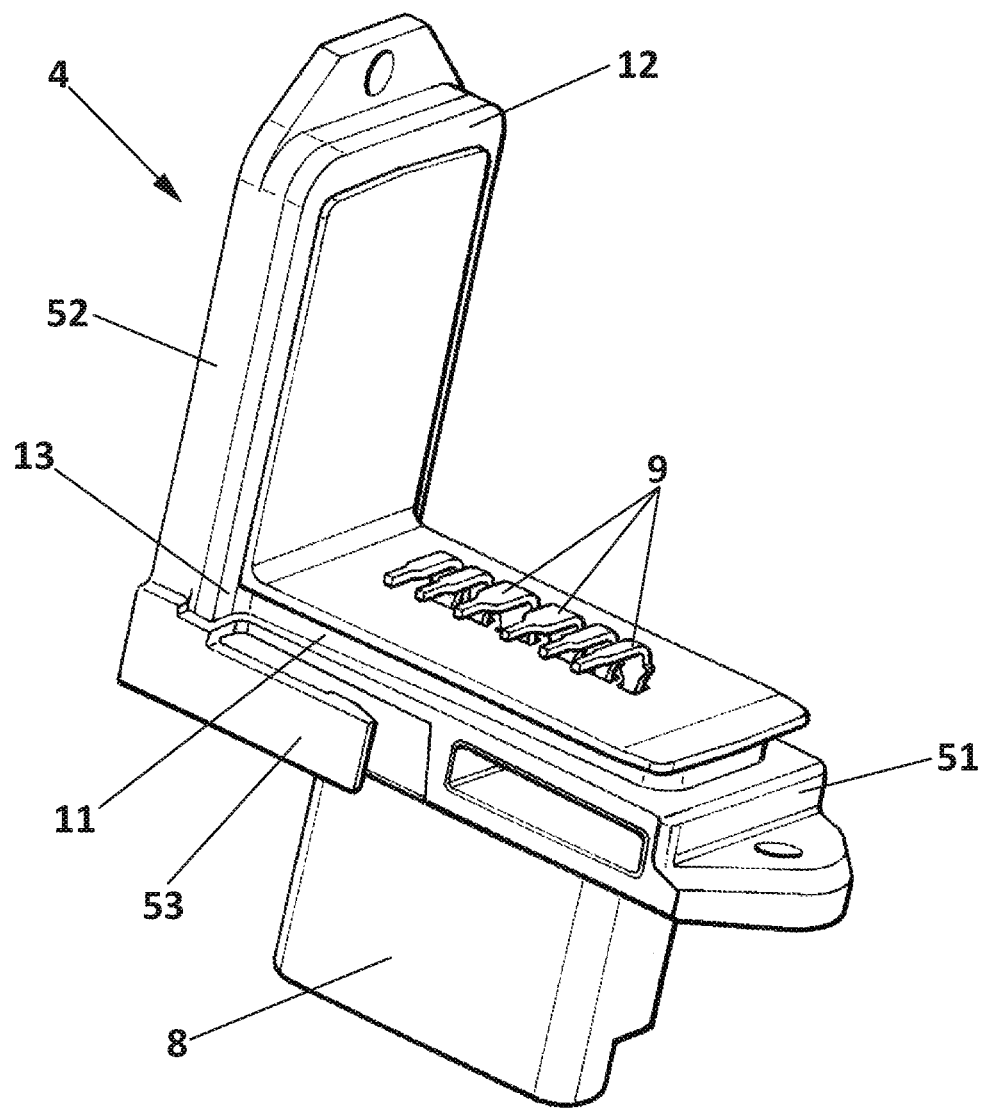
FIG. 4 is a perspective of the L shaped support with the seal assembled.

FIG. 4 is a more detail representation of the ECU 4 which comprises an L shaped support 5 with a first part 51 and a second part 52 in an angle ranging between 80 and 135 degrees to the first part 51. When the ECU 4 is coupled to the housing 3 of the drive unit 1 as shown in FIG. 3 the second part 52 is comprised in a plane transversal to the assembly direction Y and the first part 51 is comprised in a plane parallel to the assembly direction Y and transversal to the direction X of the rotary shaft 21. The motor connector 7 is mounted in the support 5 parallel to the first part 51 such that when coupling the ECU 4 to the drive unit 1 the motor connector 7 remains extending in the assembly direction Y and transversal to the direction X of the rotary shaft 21 whilst the vehicle connector 8 and the pins 9 are mounted transversally to the first part 51 of the support 5 and preferably remain extending parallel to the direction X of the rotary shaft 21, the pins 9 being accessible for being easily connected to the PCB 6.

Figure 5:
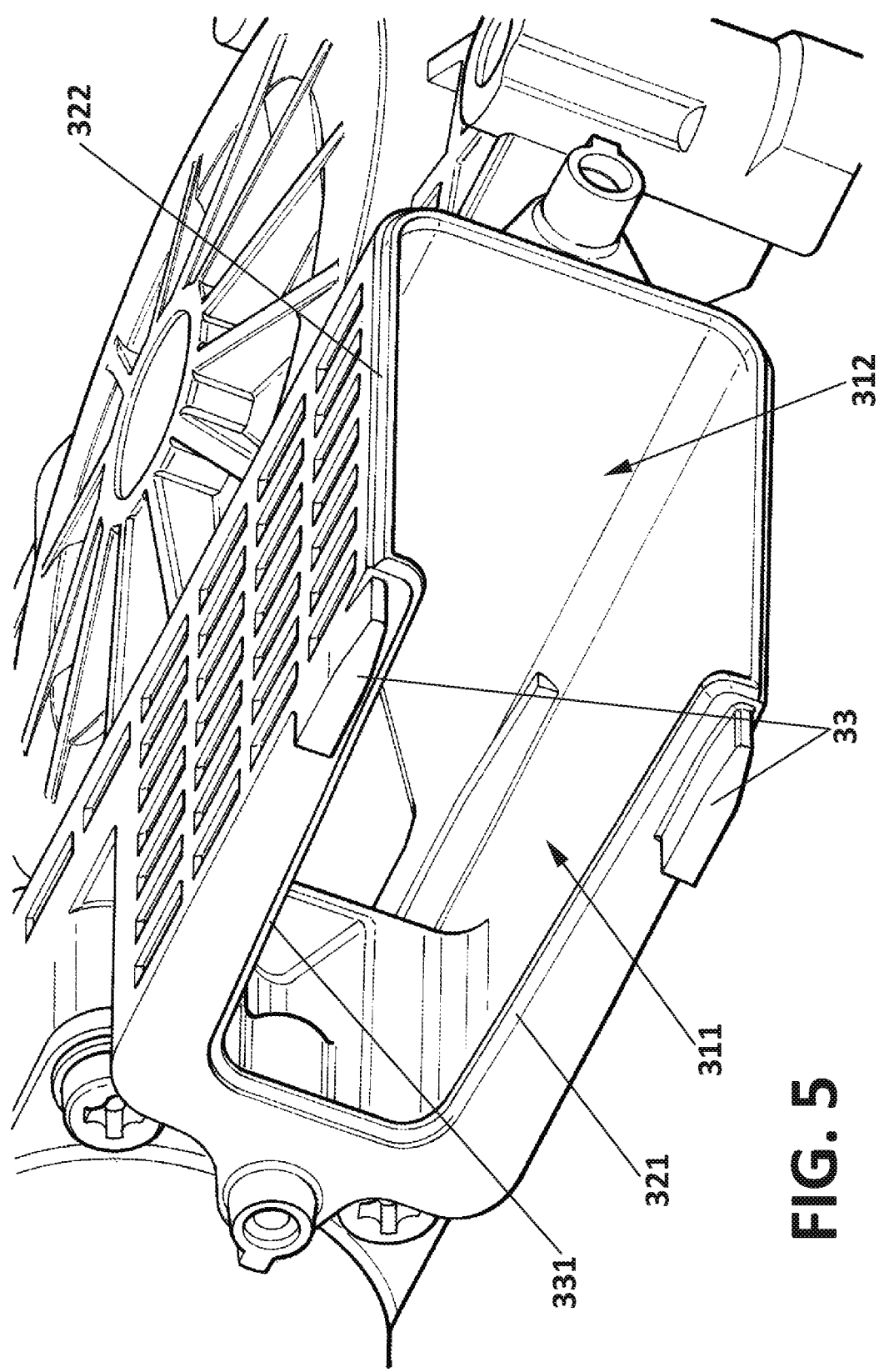
FIG. 5 is a perspective of the housing of the drive unit.

FIG. 5 is a more detail representation of the housing 3 and especially of the opening 31 where the ECU 4 is to be coupled. The opening 31 comprises a first perimeter edge 321 defining a first opening 311 comprised in a plane parallel to the assembly direction Y and a second perimeter edge 322 defining a second opening 312 transversal to the first opening 311, defining an L shaped opening 31 for the coupling of the L shaped support 5 of the ECU 4.

Figure 6:
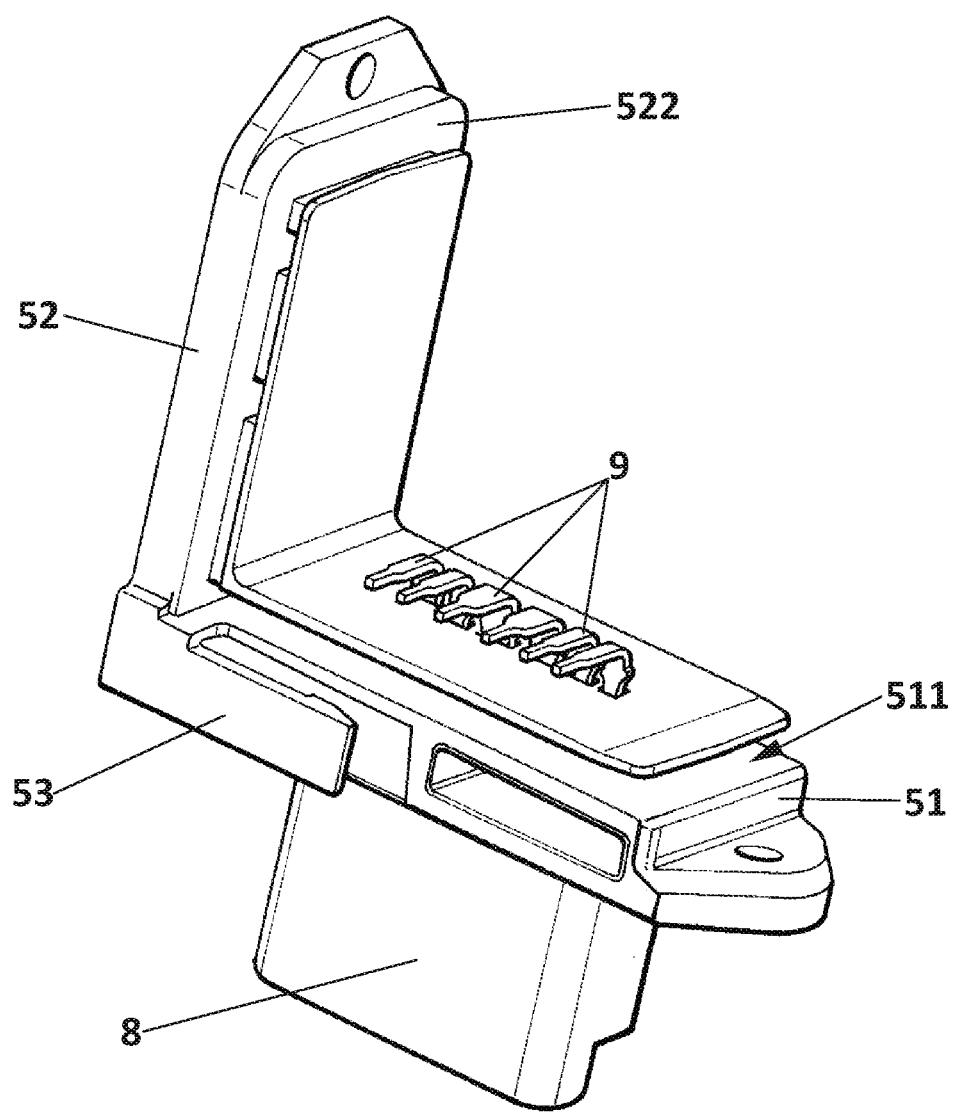
FIG. 6 is a perspective of the L shaped support.

As shown in FIG. 6 the second part 52 of the support 5 comprises a U shaped surface 522 that matches with the U shaped second perimeter edge 322.

Figure 10:
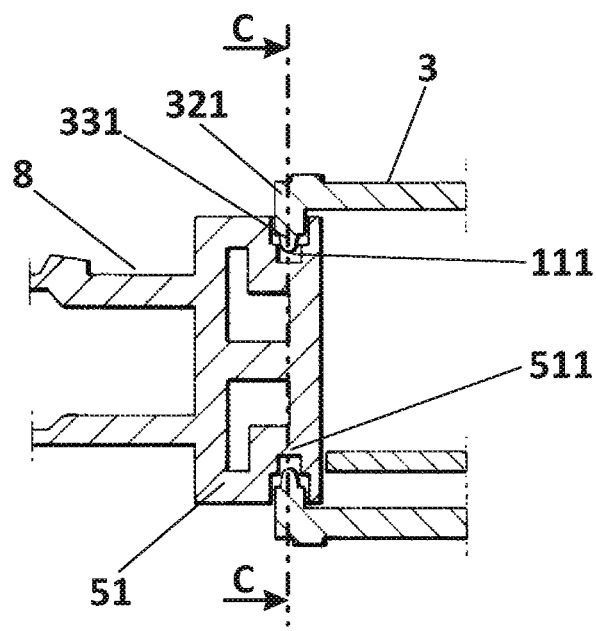
FIG. 10 is a cross section of the view of FIG. 8 along B-B line.
Figure 11:
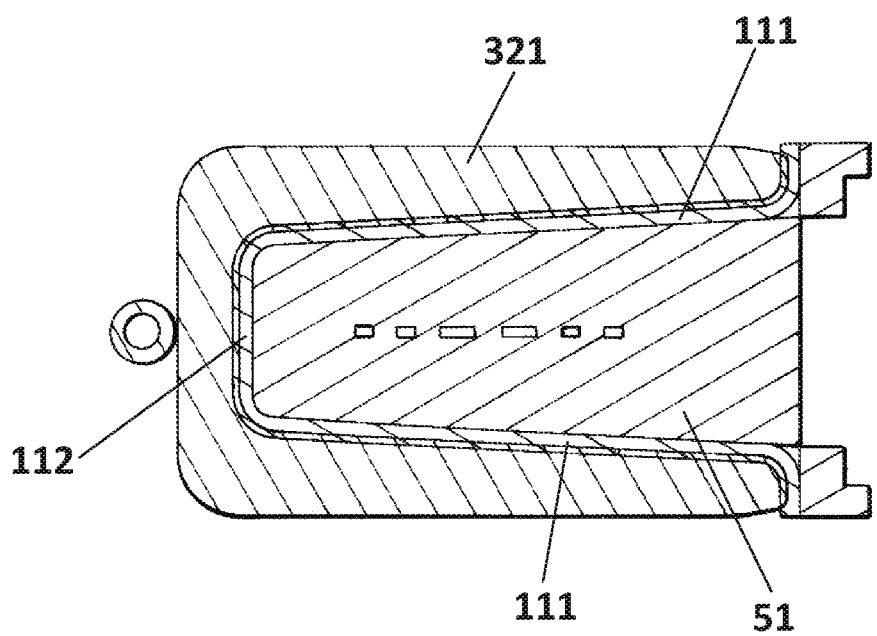
FIG. 11 is a cross section of the view of FIG. 10 along C-C line.

The first part 51 of the support 5 comprises a perimeter guiding groove 511 and the housing 3 comprises a first perimeter edge 321 such that in the coupling position a gap is defined between the groove 511 and the first perimeter edge 321 as can be seen in FIG. 10. The gap is comprised in a plane parallel to the assembly direction Y. As can be seen in FIG. 11, the perimeter groove 511 and the first perimeter edge 321 are U shaped such that the first perimeter edge 321 is insertable in the assembly direction Y in the U shaped perimeter guiding groove 511 of the first part 51 of the support 5, defining a U shaped gap for housing the first sealing part 11.

Both the perimeter guiding groove 511 and the first perimeter edge 321 comprise two branches in the assembly direction Y, the distance between the branches decreasing progressively in the assembly direction Y, as can be seen in FIG. 11.

The assembly of the disclosure comprises a seal with a first sealing part 11 and a second sealing part 12. The first sealing part 11 and the second sealing part 12 are linked by joining parts 13. The seal is rectangular cross shaped.

Figure 7:
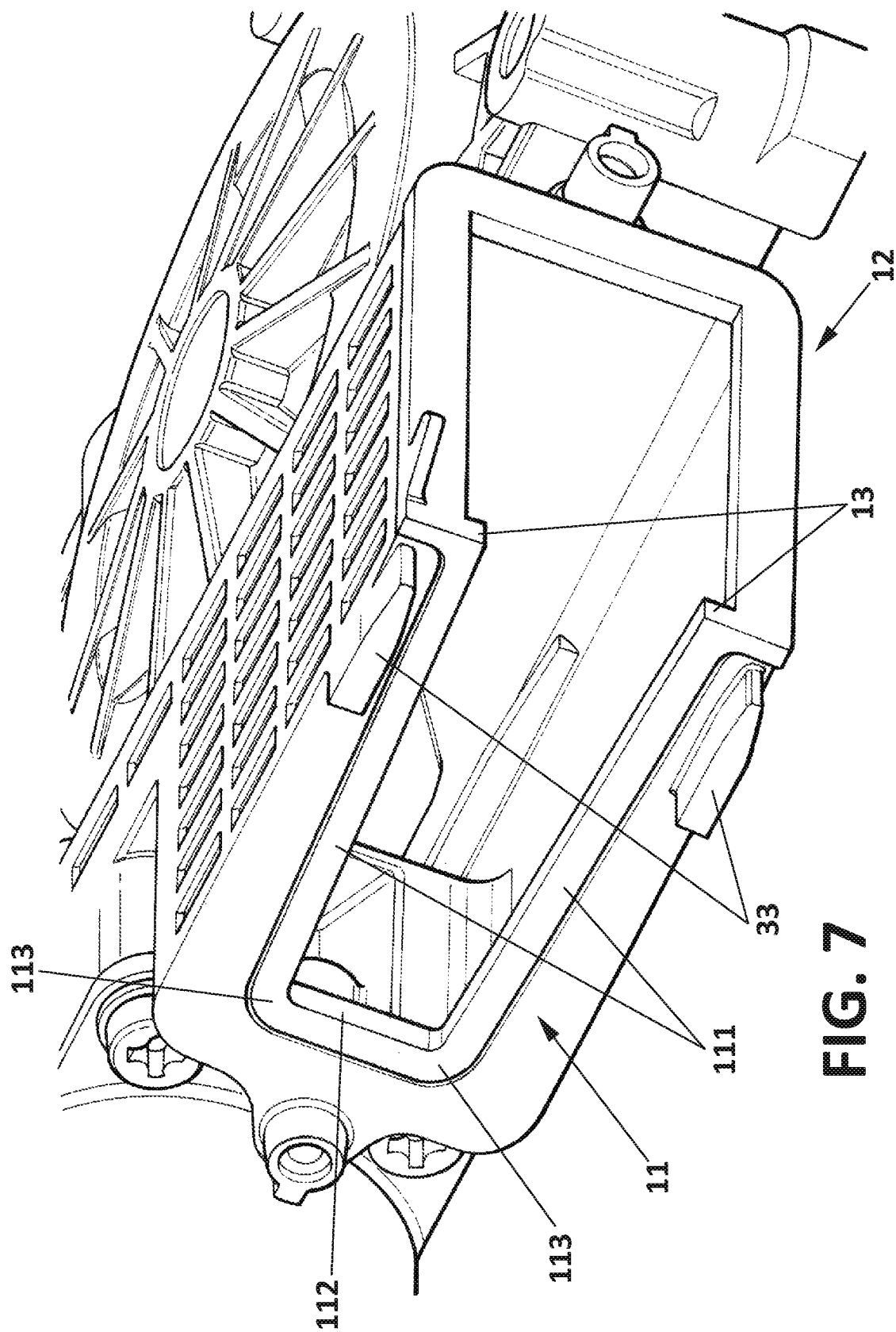
FIG. 7 is a perspective of the housing of the drive unit with the seal assembled.
Figure 8:
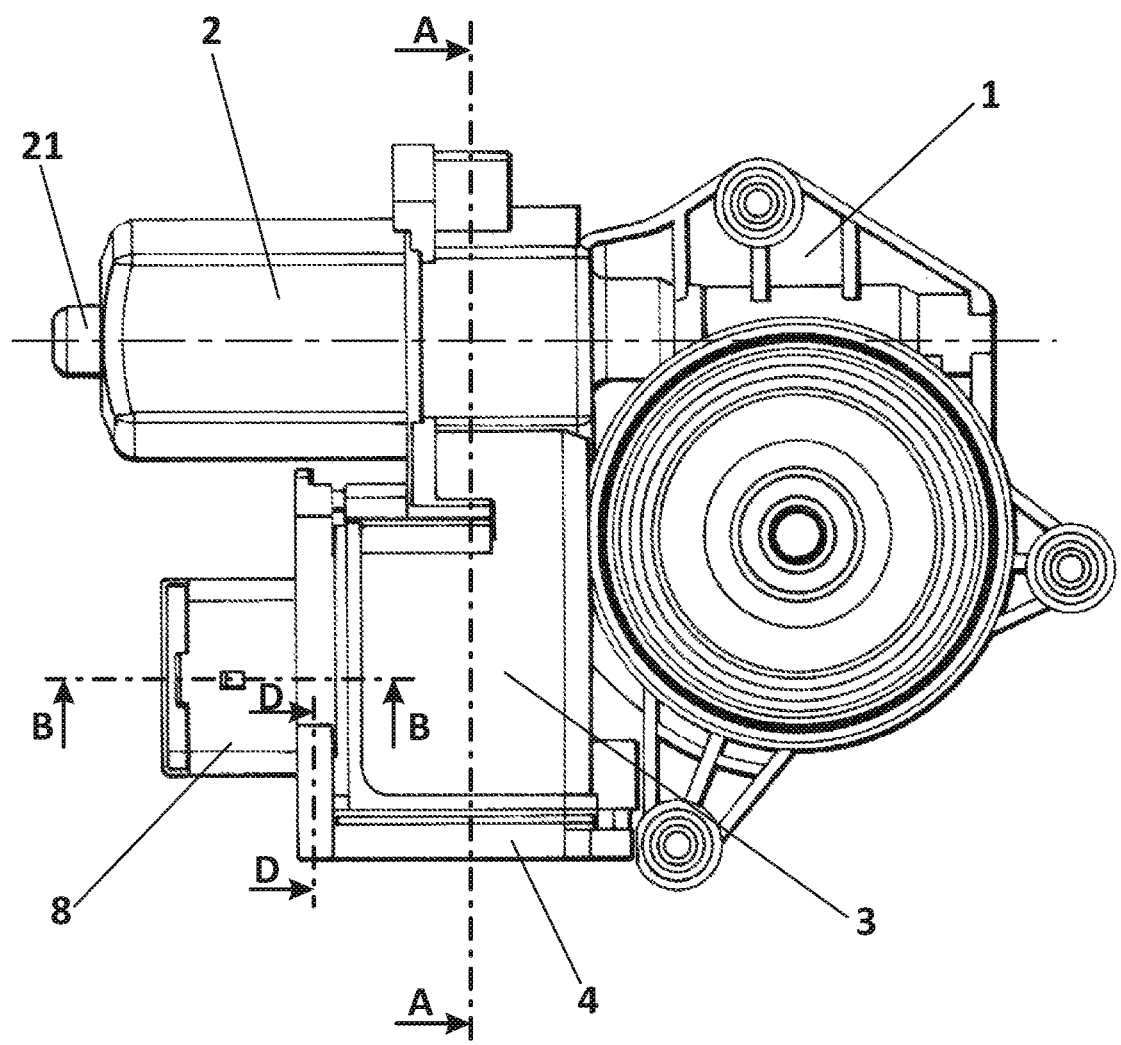
FIG. 8 is an upper view of the drive unit with the ECU connected in the final position.

The seal 10 can be assembled to the support 5 of the ECU 4 as shown in FIG. 4 or can be assembled to the housing 3 of the drive unit 1 as shown in FIG. 7.

Figure 9:
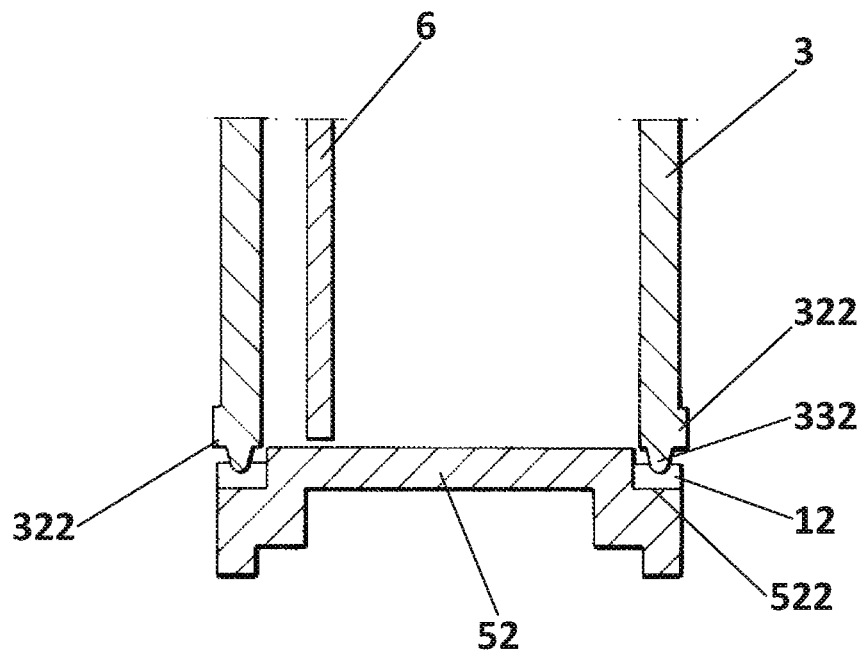
FIG. 9 is a cross section of the view of FIG. 8 along A-A line.

When the ECU 4 is coupled to the housing 3, the second sealing part 12 is compressed in the assembly direction Y between the U shaped surface 522 of the second part 52 of the support 5 an the U shape second perimeter edge 322 of the housing 3. The second perimeter edge 322 comprises a second perimeter rib 332 to improve the sealing against the second sealing part 12, can be seen in FIG. 9.

Simultaneously, when the ECU 4 is coupled to the housing 3 of the drive unit 1, the first sealing part 11 is housed in the gap defined between the perimeter guiding groove 511 of the first support part 51 and the first perimeter edge 321 of the housing 3. As shown in FIG. 7, the first sealing 11 is U shaped and comprises two longitudinal branches 111 and a transversal branch 112 between the longitudinal branches 111 such that the longitudinal branches 111 are comprised, in a plane parallel to the assembly direction Y and compressed in a direction orthogonal to the assembly direction Y whilst the transversal part 112 is compressed in the assembly direction Y. The two longitudinal branches 111 and the transversal branch 112 are joined by curved parts 113.

The cross section of the gap is uniform and smaller than the cross section of the branches of the first sealing part 11 such that the first sealing part 11 is uniformly compressed along the entire length, as shown in FIG. 11.

Figure 12:
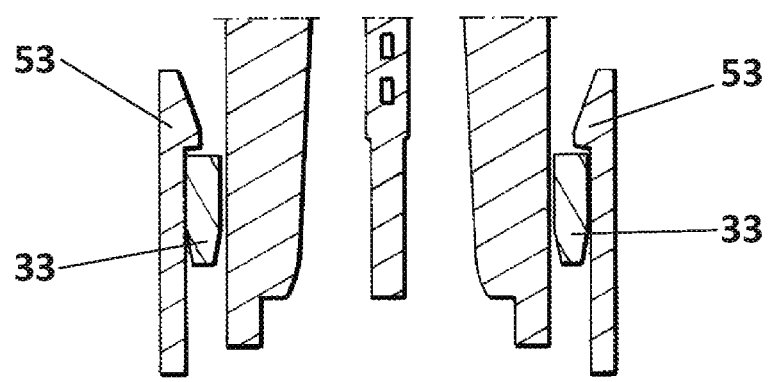
FIG. 12 is a cross section of the view of FIG. 8 along D-D line.

The ECU 4 also comprises attachment means 53 in the support 5 designed to engage with stopping means 33 in the housing 3 for securing the coupling of the ECU 4 to the housing 3 of the drive unit 1 as shown in FIG. 12.

The disclosure is obviously not limited to the specific embodiment(s) described herein, but also encompasses any variations that may be considered by any person skilled in the art (for example, as regards the choice of materials, dimensions, components, configuration, etc.), within the general scope of the disclosure.

The invention claimed is:

1. A watertight assembly for a window regulator of a vehicle comprising a drive unit and an ECU, the drive unit comprising a motor with a rotary shaft and a housing and the ECU being connectable to the drive unit in an assembly direction Y, transverse to the rotary shaft,
    the housing comprising an L shaped opening for introducing and assembling the ECU into the housing, the L shaped opening comprising a first opening in a plane parallel to the assembly direction Y and a second opening in a plane transverse to the plane of the first opening in an angle ranging between 80 and 135 degrees,
    the ECU comprising
        an L shaped support couplable in a sealing manner to the L shaped opening of the housing of the drive unit, the support comprising a first part and a second part in an angle ranging between 80 and 135 degrees to the first part such that the first part is couplable to the first opening and the second part is couplable to the second opening;
        a PCB for motor control;
        a motor connector for the connection to the motor, the motor connector being parallel to the assembly direction Y;
        a vehicle connector with pins for the connection to the vehicle wiring system, the pins being fixed transverse to the first part of the support and accessible for the connection to the PCB;
    wherein the assembly comprises a seal with
        a second sealing part which, when the ECU is coupled to the housing, is comprised and compressed in a plane transverse to the assembly direction Y between the second part of the support and a second perimeter edge of the second opening of the housing and
        a first sealing part which, when the ECU is coupled to the housing, is housed in a gap defined between the first part of the support and a first perimeter edge of the first opening of the housing, wherein the gap is U shaped and comprises two main branches and an intermediate branch between the main branches, the distance between the main branches decreasing progressively in the assembly direction Y and wherein the first sealing part is U shaped and comprises two longitudinal branches and a transverse branch between the longitudinal branches such that the gap and the first sealing part are comprised in a plane parallel to the assembly direction Y and the longitudinal branches are compressed in a direction transverse to the assembly direction Y whilst the transverse branch is compressed in the assembly direction Y.

2. The assembly as in claim 1 wherein the second part of the support comprises a U shaped surface and the second perimeter edge of the housing comprises a second perimeter rib in a plane transverse to the assembly direction such that the second sealing part is compressed between the U shaped surface and the second perimeter rib when the ECU is coupled to the housing.

3. The assembly as in claim 1 wherein the second part of the support comprises a U shaped surface with a longitudinal rib in a plane transverse to the assembly direction, such that the second sealing part is compressed between the second perimeter edge of the housing and the longitudinal rib, when the ECU is coupled to the housing.

4. The assembly as in claim 1 wherein the cross section of the main and intermediate branches of the gap is uniform and smaller than the cross section of the first sealing part.

5. The assembly as in claim 1 wherein the gap is defined between a perimeter guiding groove of the first part of the support and a first perimeter rib of the housing such that the first perimeter rib of the housing slides inside the perimeter guiding groove of the first part when the ECU is coupled to the housing of the drive unit.

6. The assembly as in claim 1 wherein the gap is defined between a guiding groove of the first perimeter edge of the housing and a perimeter flange of the first part of the support such that the perimeter flange of the first part of the support slides inside the guiding groove of the housing when the ECU is coupled to the drive unit.

7. The assembly as in claim 1 wherein the seal is rectangular or squared cross shaped.

8. The assembly as in claim 1 wherein the first sealing part and the second sealing part are linked by joining parts.

9. The assembly as in claim 1 wherein the two longitudinal branches and the transverse branch of the first sealing part are joined by curved parts.

10. The assembly as in claim 1 wherein the first sealing part and second sealing part are a single and continuous part.

11. The assembly as in claim 1 wherein the seal is either assembled on the support of the ECU or assembled on the housing of the drive unit.

12. The assembly as in claim 11 wherein the seal is over-molded either on the support or on the housing.

13. The assembly as in previous claim 11 further comprising a sealing element between the pins and the vehicle connector.

14. The assembly as in claim 13 wherein the sealing element is a part of the seal.

15. The assembly as in claim 14 wherein support of the ECU comprises attachment means to engage with stopping means in the housing for securing the coupling.

\* \* \* \* \*